United States Patent [19]

Dehne

[11] Patent Number: 5,257,690

[45] Date of Patent: Nov. 2, 1993

[54] CONVEYOR CHAIN WITH LINKED BUSHINGS

[76] Inventor: Clarence A. Dehne, 29579 Foxgrove Rd., Farmington Hills, Mich. 48334

[21] Appl. No.: 29,989

[22] Filed: Mar. 12, 1993

Related U.S. Application Data

[63] Continuation of Ser. No. 767,013, Sep. 27, 1991, abandoned.

[51] Int. Cl.⁵ .............................................. B65G 45/02
[52] U.S. Cl. ........................................ 198/500; 474/91
[58] Field of Search ..................... 198/500; 474/91; 184/12, 15.1

[56] References Cited

U.S. PATENT DOCUMENTS

| | | | |
|---|---|---|---|
| 268,089 | 11/1950 | Diosi, Sr. ............................. | 407/59 |
| 565,199 | 8/1896 | Berger ................................ | 474/91 |
| 583,854 | 6/1897 | Wood ................................. | 474/91 |
| 2,159,396 | 5/1939 | Miller et al. ....................... | 474/91 X |
| 2,660,898 | 12/1953 | Kew .................................. | 198/500 |
| 4,029,366 | 6/1977 | Baylor ............................... | 474/91 X |
| 4,117,738 | 10/1978 | McKeon ............................ | 474/228 |
| 4,150,584 | 4/1979 | Theijsmeijer .................... | 198/852 |
| 4,267,691 | 5/1981 | Schoenick ........................ | 198/851 X |
| 4,464,151 | 8/1984 | Kahl ................................. | 474/231 |
| 4,571,229 | 2/1986 | Burk ................................. | 474/231 |
| 4,704,099 | 11/1987 | Rohloff ............................ | 474/231 |
| 4,729,754 | 3/1988 | Thuerman ....................... | 474/207 |
| 4,729,756 | 3/1988 | Zimmer ............................ | 474/91 X |
| 4,895,248 | 1/1990 | Wahrén ............................. | 198/852 |
| 4,995,852 | 2/1991 | Takahashi et al. .............. | 474/91 |
| 5,078,654 | 1/1992 | Naz ................................... | 474/91 |

FOREIGN PATENT DOCUMENTS

| | | | |
|---|---|---|---|
| 3087462 | 4/1988 | Japan .............................. | 198/500 |
| 552235 | 3/1943 | United Kingdom ............ | 474/91 |

Primary Examiner—Robert P. Olszewski
Assistant Examiner—Cheryl L. Gastineau
Attorney, Agent, or Firm—Brooks & Kushman

[57] ABSTRACT

An X-link conveyor chain (10) having a center link (12) assembled to side links (14) by a pin (16) having lubrication grooves (22). Lubrication grooves (22) extend from first and second T-head ends (38) and (40) of the pin (16) which facilitate lubrication of the central portion of the pin (16). Alternatively, lubrication grooves (50) may be provided in first and second ends (24) and (26) of the center link (12). Lubrication grooves (50) may be provided either directly or as a slot (62) formed in bushings (18) which are received in the first and second ends (24) and (26) of the center link (12). A bushing (18) disposed in first and second ends (24, 26) of a center link (12) provides a renewable X-link conveyor chain which may be repaired by replacing the bushings (18).

21 Claims, 3 Drawing Sheets

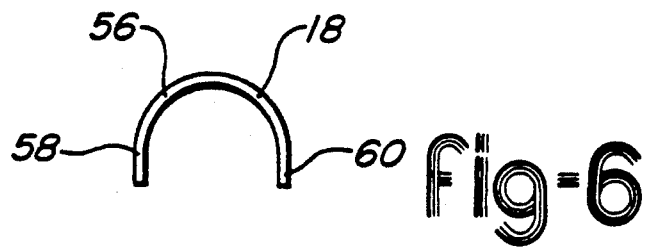
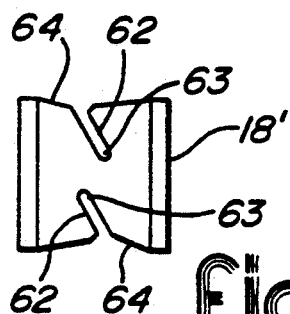
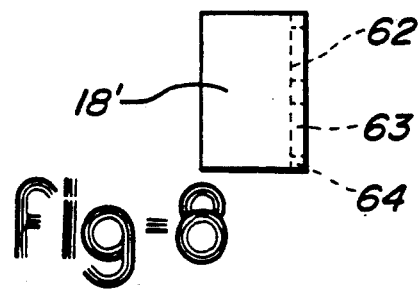
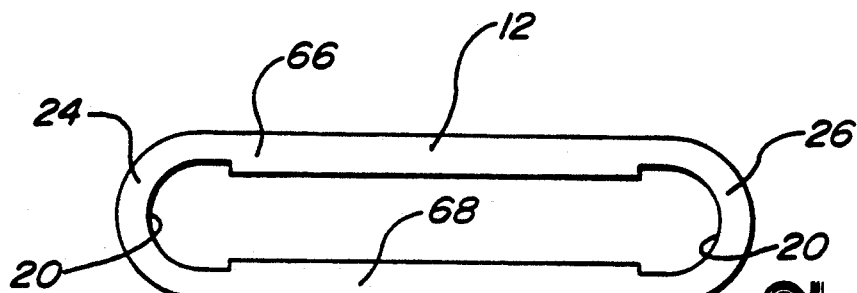
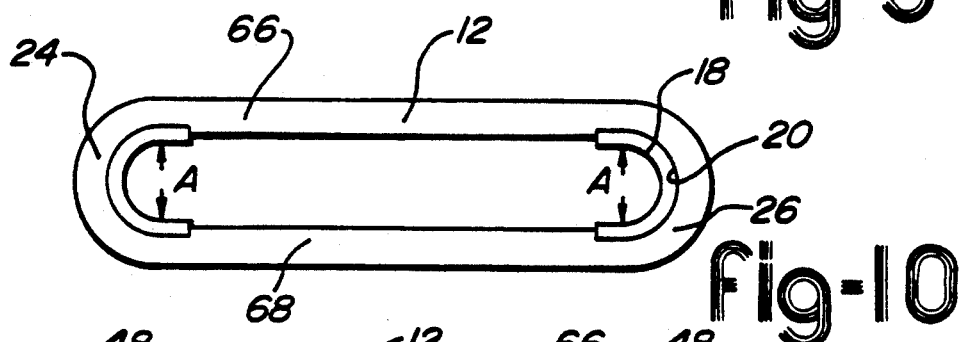
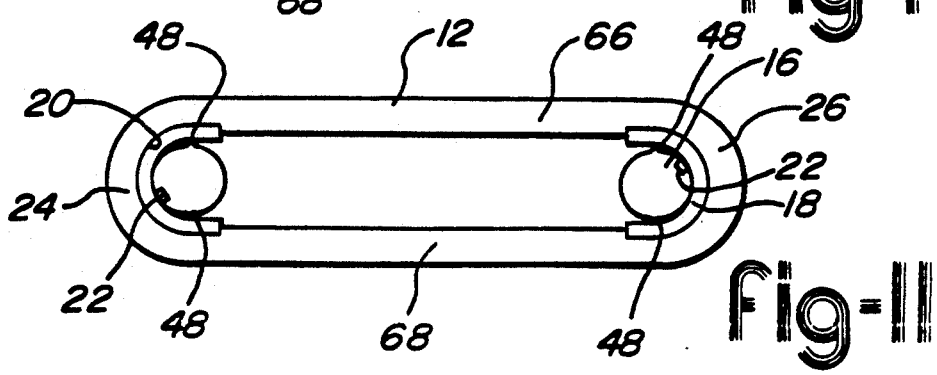

CONVEYOR CHAIN WITH LINKED BUSHINGS

This is a continuation of copending application Ser. No. 07/767,013 filed on Sep. 27, 1991, abandoned.

TECHNICAL FIELD

This invention relates to conveyor chains of the X-link type in which center links and side links are interconnected by pins.

BACKGROUND OF INVENTION

Conveyor chains are used widely in industry to move heavy articles, such as car bodies on an assembly line through the assembly process. A preferred type of conveyor chain is an X-link conveyor chain in which side links are connected to two center links by pins. The center and side links are generally forged steel links which are hardened to improve wear characteristics. Even though the links and pins are hardened, over time the links and pins wear as a result of friction. As the chain is used, links and pins become worn and the conveyor chain must be replaced periodically. It is expensive to replace a conveyor chain and a need exists for a reparable conveyor chain in which worn links can be renewed.

Forged chain links generally have a parting line extending longitudinally on both the inside and outside surfaces of the chain links. The parting lines are generally at the mid-point of the chain links and create a focused wear point for pins used to connect the links together.

A key factor in extending the life of a chain is providing adequate lubrication of the chain. Lubrication (in the form of oil, grease or other lubricant) is applied to wear surfaces of the pins and links. Lubrication may be applied by periodic application or automatic application by conventional means. One problem faced in the lubrication of X-link conveyor chains is that it is difficult to provide adequate lubrication between the bearing surfaces of the pin and links, especially in the central portions thereof, without providing excessive lubrication which tends to drain from the chain in an undesirable fashion.

DISCLOSURE OF INVENTION

According to one embodiment of the present invention an X-link conveyor chain is provided wherein one or more lubrication grooves are provided in a bearing surface of pins which interconnect the side links and center links of the chain. The center link of the chain is preferably provided with a bushing which is disposed in a semi-circular pocket in the end of a center link. The bushing is interlocked into the semi-circular pocket by locking lips which engage end faces of the bushing.

Preferably both of the ends of the center link are provided with a bushing disposed in two semi-circular pockets. The resiliency of the bushing assists to keep the bushing in the pocket in conjunction with the co-operating locking lips.

According to another embodiment of the invention an X-link conveyor chain having a bushing is provided which has a lubrication channel extending from a first side of the bushing adjacent to a first end of the pin toward a second side of the bushing adjacent a second end of the pin but not extending from the first end to the full height of the bushing. In addition, a second lubrication channel extending from the second side of the bushing but not extending from the second end through the full height of the bushing is provided.

In accordance with another embodiment of the invention, an improved center link for an X-link conveyor chain is provided. The improved center link features a lubrication groove which is formed in the bearing surface of the center link and extends partially through the bearing surface from one end whereby lubrication supplied to the center link may be retained in the lubrication groove. One or more lubrication grooves may be provided in the bearing surface of the center link. The lubrication groove preferably extends at a non-perpendicular angle to the lateral face of the center link.

The present invention also relates to an improved pin for an X-link conveyor chain. The improved pin includes a body having first and second ends and a bearing surface defined by a substantially cylindrical surface of the pin. A lubrication groove is formed in the bearing surface of the pin and extends partially from one end toward the other end of the pin so that lubrication supplied to the pin will be retained in the lubrication groove. The lubrication groove preferably extends at a non-perpendicular angle from the end pin. The lubrication groove is preferably enlarged or flared adjacent to the end of the pin to form a mouth in which a lubricant may be entrained and directed into the lubrication groove.

BRIEF DESCRIPTION OF DRAWING

FIG. 6 is a plan view of a bushing made in accordance with the present invention.

FIG. 7 is a side elevation view of a bushing having lubrication grooves made in accordance with the present invention.

FIG. 8 is a side elevation view of a bushing having lubrication grooves made in accordance with the present invention.

FIG. 9 is a schematic plan view of a center link made according to the present invention.

FIG. 10 is a schematic plan view of a center link and a bushing made according to the present invention.

FIG. 11 is a schematic plan view of a center link, bushing and pin assembled together.

BEST MODE FOR CARRYING OUT INVENTION

Figure 1:
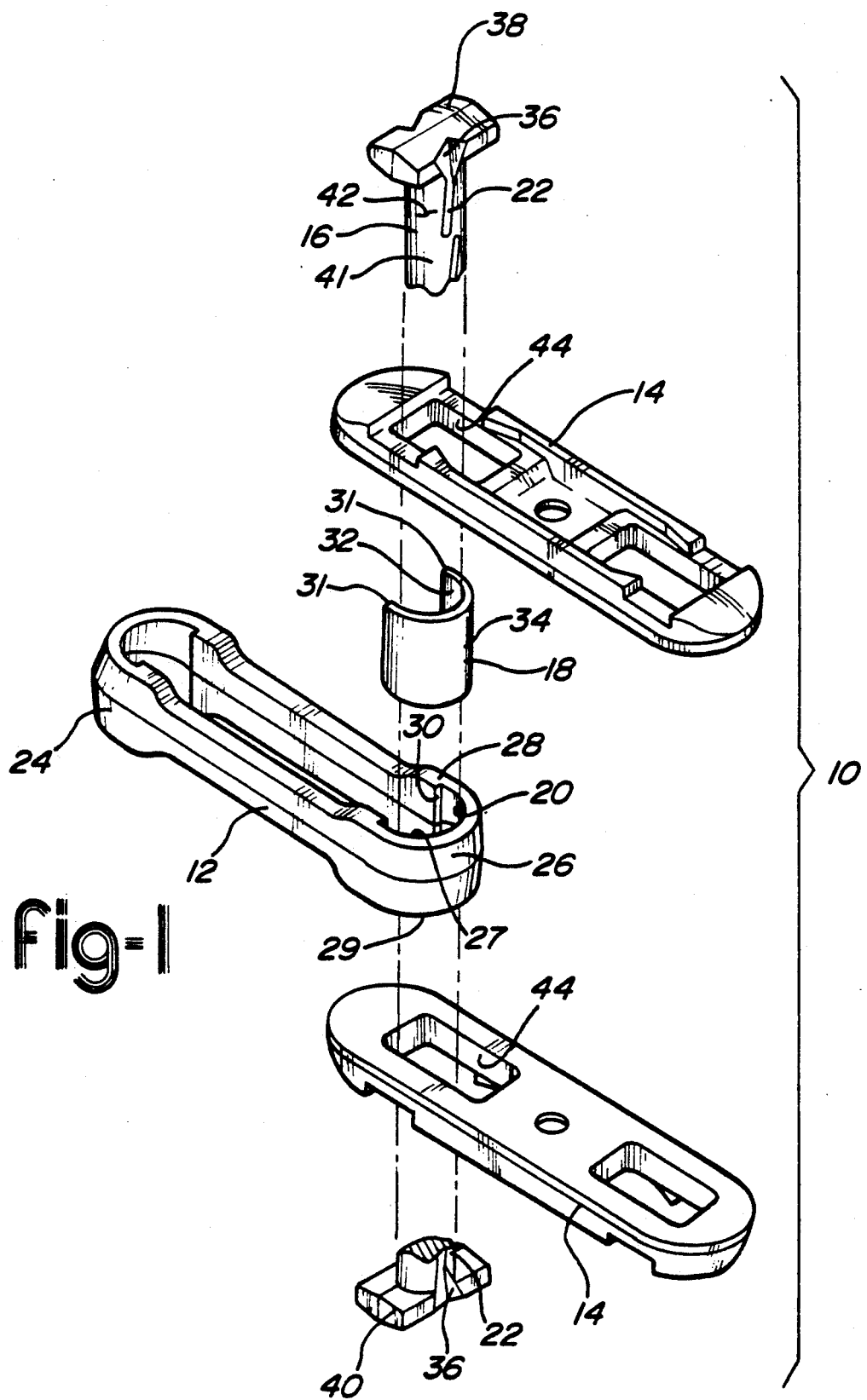
FIG. 1 is an exploded perspective view of a small length of X-link conveyor chain made according to the present invention.

Referring to FIG. 1, a conveyor chain 10 of the X-link type is shown which includes the improvements of the present invention. The conveyor chain 10 includes a center link 12 which is connected to two side links 14 by means of a pin 16. According to the invention, a bushing 18 is inserted into the center link 12 in a pocket 20. The bushing 18 has a semi-cylindrical portion and first and second straight wall portions as will be more fully described below. The pocket 20 is formed in one end of the center link 12 and has a substantially semi-circular surface.

According to another aspect of the invention, lubrication grooves 22 are provided in each of the pins 16. A plurality of lubrication grooves 22 are preferably provided and extend from one end of the pin 16 toward the other end but not entirely through the length of the pin 16. It is intended that a lubricant entering a lubrication groove 22 will become trapped in the lubrication groove. The first end 24 of the center link 12 is shown with the two side links 14 held in place by the pin 16. The second end 26 of the center link 12 are shown with the parts exploded for a better understanding of their assembly. First and second ends 24 and 26 are also referred to as leading and trailing ends respectively. The first and second ends 24 and 26 each define a concave, substantially semi-cylindrical face on an interior facing wall and have first and second lateral sides 28 and 29 each facing a side link 14.

The pocket 20 includes locking lips 30 which are adapted to engage with end faces 31 of the bushing 18. The bushing 18 includes a bearing surface 32 which actually engages the pin and a back surface 34 which overlies the cylindrical surface of the pocket 20.

Lubrication grooves 22 preferably include a mouth portion 36 which extends through a first T-head end 38 of the pin 16. A second T-head end 40 also preferably includes a lubrication groove having a mouth 36. The illustrated lubrication grooves extend at a non-perpendicular angle relative to the axis of the pin 16. Lubrication grooves extend from the first and second T-head ends 38 and 40 and preferably terminate in the central portion of the pin 16. The lubrication grooves may extend axially past the mid-point, particularly if they are angularly oriented as shown. The pin 16 includes a bearing surface 42 having a substantially cylindrical shape.

Side link assembly slots 44 are elongated slots through which the T-head ends 38 and 40 can be inserted for assembling the side links 14 to the center link 12 and pin 16.

Figure 2:
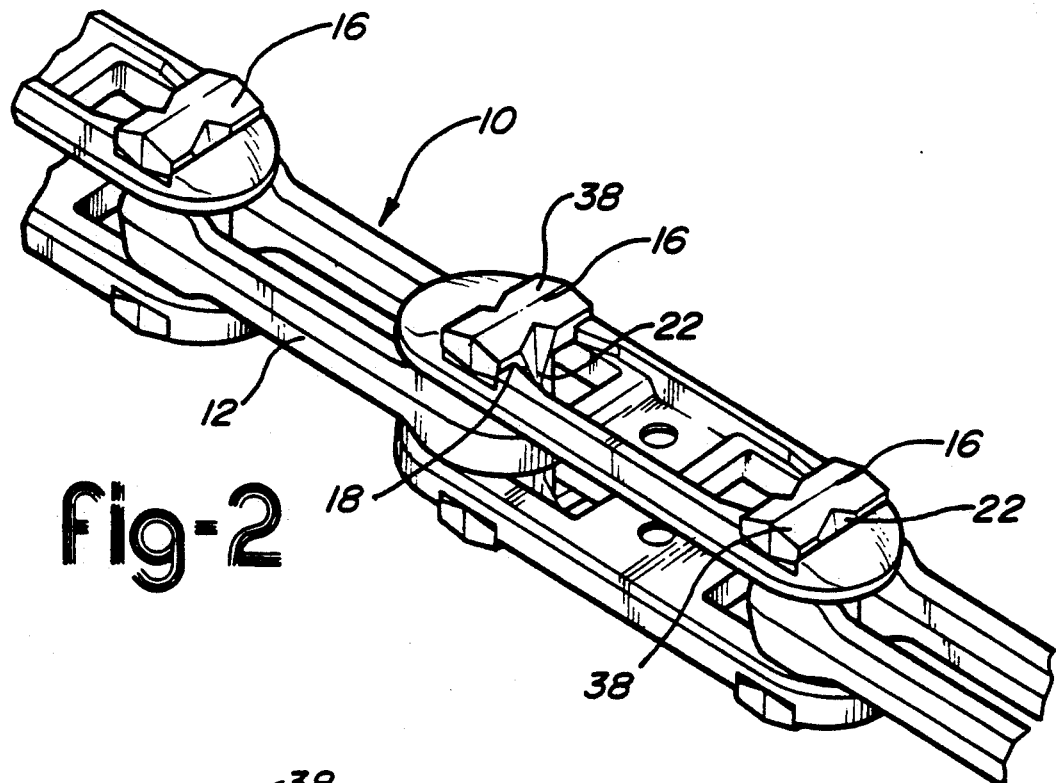
FIG. 2 is a perspective view partially fragmented to show a length of X-link conveyor chain made in accordance with the present invention.

Referring to FIG. 2, several links of the conveyor chain 10 are shown assembled together. In particular, FIG. 2 shows a pin 16 assembled to a center link 12 having a bushing 18. Lubrication grooves extend from the outer end of the first T-head end 38 to a point inboard of the bushing 18.

Figure 3:
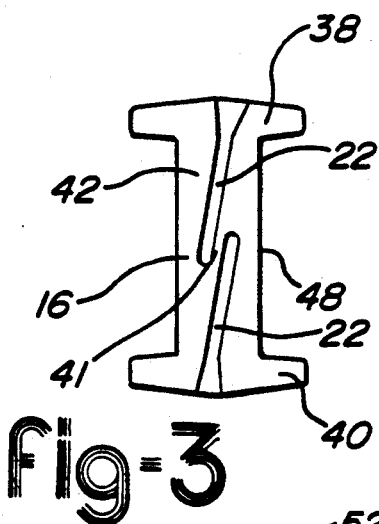
FIG. 3 is a side elevation view of a pin having lubrication grooves in accordance with the present invention.
Figure 4:
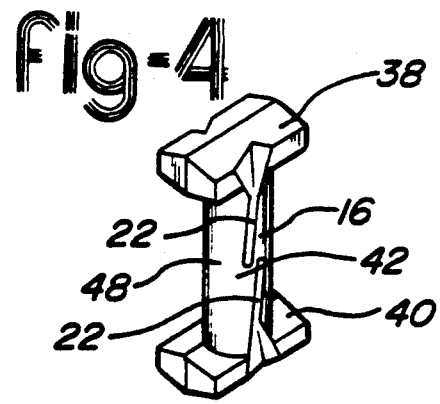
FIG. 4 is a perspective view of a pin made in accordance with the present invention.

FIGS. 3 and 4 show the lubrication grooves 22 in a pin 16. Lubrication grooves 22 extend from both of the T-head ends 38 and 40 at an angular orientation to a central portion 41 of the pin. The lubrication grooves 22 in the preferred embodiment extend more than half the length of the pin 16 and terminate at spaced points in the central portion 41 of the pin. In this preferred embodiment the lubrication grooves assure adequate lubrication of the central portion 41 of the pin.

Also shown in FIGS. 3 and 4 is the parting line 48 of the pin. The pins 16 are preferably forged parts and as a result include a parting line 48. The parting line 48 is preferably formed so that it is within the radius of the cylindrical bearing surface portion 42 of the pin 16. This can be achieved by forming the pin 16 in a generally oval shape with the sides of the pin 16 adjacent to parting line 48 being of reduced radius relative to the radius of the cylindrical bearing surface 42.

Figure 5:
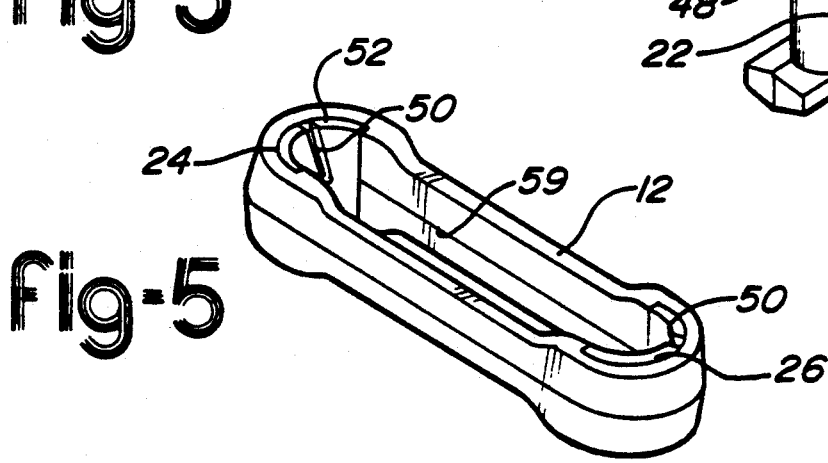
FIG. 5 is a perspective view of a center link of an X-link conveyor made in accordance with the present invention.

Referring to FIG. 5, an alternative embodiment of the present invention is shown in which lubrication grooves 50 are provided in the first and second ends 24 and 26 of the center link 12. Lubrication grooves as shown extend only partially through the width of the center link 12. The lubrication grooves 50 preferably also include a chamfered portion 52 in which a lubricant may be entrained and directed into the lubrication groove 50. In this embodiment, the center link 12 does not include a bushing.

The center link 12 is preferably finished in the areas of the first and second ends 24 and 26 by punching to remove the parting line 54 as an inwardly facing wall thereof and provide a more closely cylindrical shape than provided X-link chains in prior art. By removing a portion of the parting line 54 there is a reduction in wear of the pin 16, as compared with prior art designs wherein the parting line 54 tended to focus wear at the center of the pin 16. The inclusion of the lubrication grooves 50 assures adequate lubrication even though the cylindrical bearing surface 42 of the pin 16 has a closer fit relative to the finished ends 24 and 26.

Referring to FIGS. 6, 7 and 8, two bushing embodiments are shown. In FIG. 6, a bushing 18, having no lubrication groove is shown. In FIGS. 7 and 8, a bushing 18' is shown in which lubrication grooves are included. The center link 12 may have a pair of bushings 18 assembled to leading and trailing ends, wherein the bearing surfaces 32 are formed on the bushings 18. In addition, lubrication grooves 22 may extend through the bushings 18' shown in FIGS. 7 and 8 from the bearing surfaces 32 to the body of the center link 12 over which the bushings 18' are assembled. Bushing 18 or 18' are each adapted to be received in the pocket 20 of the center links as previously described.

Referring to FIG. 6, a bushing 18 is shown in greater detail. The bushing 18 shown in FIG. 6 includes a semi-cylindrical portion 56 and first and second straight wall portions 58 and 60 on opposite sides of the semi-cylindrical portion 56. The bushing as shown is generally U-shaped.

As shown in FIGS. 7 and 8, a more specialized bushing 18' is shown in which lubrication grooves are included as slots extending through the bushing 18'. The slots 62 include an elongated portion 63 and a chamfered lead-in portion 64. The slots 62 extend from the ends of the bushing into the central portion and may, if desired, extend past the mid-line of the bushing.

Referring generally to FIGS. 9-11, a schematic representation of the relationship of the center link 12, pin 16 and bushing 18 are shown. In FIG. 9, the center link 12 is shown to include first and second ends 24 and 26 which interconnect first and second sides 66 and 68 which extend parallel to each other. A pocket 20 is formed in each of the first and second ends.

Referring to FIG. 10, a bushing is shown installed in each of the pockets 20. The arrows A in FIG. 10 represent the outward biasing force which is preferably provided by using a bushing 18 having a slightly greater radial extent than the pocket 20 in which it is received so that the resiliency of the bushing 18 pressing against the pocket 20 aids in locking the bushing 18 in place.

Referring to FIG. 11, the general orientation of the pin 16 relative to the bushing 18 and center link 12 after assembly is shown. The pin 16 has a lubrication groove 22 and also is of somewhat oval shape to accommodate the parting line 48.

The bushings 18 are preferably provided as part of a new chain. The majority of the wear of an X-link conveyor chain 10 is confined to the region in which the bushings are inserted. By provided a bushing which may be tapped out and replaced, the X-link conveyor chain may be renewed by merely replacing each of the bushings and, if desired, replacing the pins 16.

Another advantage of the use of a bushing 18 is that a special hardened alloy may be used for the bushing or a powder metal lubricated sintered bushing may be used to provide an extra long-wearing chain. If an alloy or a specially hardened bushing 18 is used, the heat treating and hardening of the center link 12 may be eliminated or modified to achieve a saving in manufacturing cost.

It will be appreciated by one of ordinary skill in the art that several embodiments of the present invention have been disclosed above. Additional modifications and variations would be readily apparent to one of ordinary skill in the art. The above description should be understood in an illustrative sense and not in any limiting sense. The scope of the present invention should be measured by the following claims:

I claim:

1. A conveyor chain comprising:
   a plurality of center links, said center links each having two parallel sides, a leading end and a trailing end, said leading end and said trailing end being generally U-shaped, said center links each having a semi-circular pocket formed in at least one of said ends;
   a plurality of side links, each of said side links having two parallel sides, a generally U-shaped leading end and a generally U-shaped trailing end, a pair of said side links being disposed on opposite sides of two of said center links to connect said two center links together;
   a plurality of pins each having a substantially cylindrical body portion extending between a first end and a second end, said pins extending through one of said center links and two of said side links at one of said U-shaped ends of each of said one center link and two side links;
   a bushing having a semi-cylindrical portion secured within said semi-circular pocket, said bushing having end faces at two distal ends thereof; and
   said center links having locking lips disposed adjacent the juncture of said semi-circular pocket and said parallel sides, said bushing having a bearing surface and a backing surface on opposite sides, said bearing surface and said backing surface being substantially parallel to each other and defining a bushing of substantially uniform thickness between said bearing surface and said backing surface, said locking lips engaging said end faces of said bushing to retain said bushing within said semi-circular pocket in a fixed relationship.

2. The conveyor chain of claim 1 wherein said bushing is generally U-shaped having first and second straight wall portions extending tangentially from said semi-cylindrical portion to said distal ends and extending substantially parallel to each other.

3. The conveyor chain of claim 1 wherein said center link has a parting line extending longitudinally therethrough intermediate the width of the center link, said parting line being interrupted by said semi-circular pocket whereby a smooth cylindrical surface is provided for said bushing.

4. The conveyor chain of claim 3 wherein said bushing is of slightly greater radial extent than said pocket whereby said bushing is retained in said pocket in part by the resiliency of said bushing pressing against said pocket.

5. The conveyor chain of claim 1 wherein said center links have two semi-circular pockets formed one in each of said leading and trailing ends.

6. A conveyor chain comprising:
   a plurality of center links, said links each having two parallel sides, a leading end and a trailing end, said leading and trailing ends being generally U-shaped, said center links each having a semi-circular pocket formed in at least one of said ends;
   a plurality of side links, said side links having two parallel sides, a leading end and a trailing end, said ends being generally U-shaped, a pair of said side links being disposed on opposite sides of two of said center links to connect said two center links together;
   a plurality of pins each having a substantially cylindrical body portion extending along an axis between a first end and a second end, said pins extending through one of said center links and two of said side links at one of said U-shaped ends of each of said one center link and two side links;
   a bushing having a semi-cylindrical portion secured within said semi-circular pocket, said bushing defining a bearing surface on the concave side thereof and a backing surface on the convex side thereof with the thickness of said bushing being the distance between said bearing surface and said backing surface, said bearing surface having a height as measured parallel to the axis of said pin, said bushing having a lubrication channel extending from a first side of said bushing adjacent said first end of said pin toward a second side of said bushing adjacent said second end of said pin but not extending from said first end through the full height of said bushing.

7. The conveyor chain as in claim 6 wherein said lubrication channel includes a circumferentially extending chamfer in said first side of said bushing defining a space between said cylindrical portion of said pin and the bearing surface of said bushing in which a lubricating fluid may be entrained.

8. The conveyor chain as in claim 6 further comprising said bushing having a lubrication channel extending from said second side of said bushing adjacent said second end of said pin toward said first side of said bushing adjacent said first end of said pin but not extending from said second end through the full height of said bushing.

9. The conveyor chain as in claim 8 wherein said lubrication channel includes a pair of circumferentially extending chamfers in said first and second sides of said bushing defining a space between said cylindrical portion of said pin and the bearing surface of said bushing in which a lubricating fluid may be entrained.

10. The conveyor chain as in claim 6 wherein said lubrication channel includes an elongated groove defining a space between said cylindrical portion of said pin and the bearing surface of said bushing in which a lubricating fluid may be received.

11. A center link for an X-link conveyor chain having a plurality of center links interconnected on opposite ends by paired side links and pins, said pins extending through said pair of said side links and one of said center links, said center link comprising:
   an elongated body having a leading end and a trailing end, said leading and trailing ends having a bearing surface defined by a concave substantially semi-cylindrical face on an interior facing wall thereof, said leading and trailing ends having first and second lateral faces on opposite lateral sides, said first and second lateral faces each facing one of said side links; and a lubrication groove formed in said bearing surface and extending partially from said first lateral face toward said second lateral face at a non-perpendicular angle from said lateral face, wherein lubrication supplied to said center link is retained in said lubrication groove.

12. The center link of claim 11 further comprising:
a second lubrication groove formed in said bearing surface and extending partially from said second lateral face toward said first lateral face, wherein lubrication supplied to said center link is retained in said second lubrication groove.

13. A center link for an X-link conveyor chain having a plurality of center links interconnected on opposite ends by paired side links and pins, said pins extending through said pair of said side links and one of said center links, said center link comprising:

an elongated body having a leading end and a trailing end, said leading and trailing ends having a concave substantially semi-cylindrical face on an interior facing wall thereof, said leading and trailing ends having first and second lateral faces on opposite lateral sides, said first and second lateral faces each facing one of said side links;

a pair of bushings assembled to said leading and trailing ends, bearing surfaces being formed on said bushings;

a lubrication groove formed in said bearing surface and extending partially from said first lateral face toward said second lateral face, wherein lubrication supplied to said center link is retained in said lubrication groove.

14. The center link of claim 13 wherein said lubrication groove extends through said bushing from said bearing surface to the body of said center link over which said bushing is assembled.

15. The conveyor chain as in claim 11 wherein said center link further comprises a chamfer in said first lateral face defining a space between said pin and said bearing surface in which a lubricating fluid may be entrained and directed to said lubrication groove.

16. A pin for an X-link conveyor chain having a plurality of center links interconnected on opposite ends by paired side links and pins, each of said pins extending through said pair of said side links and one of said center links, each of said pins comprising:

a body having a first end and a second end, said body having a bearing surface defined by a substantially cylindrical exterior face contacting one of said central links and a pair of said side links, said first and second ends protruding through and exteriorly of the side links; and a lubrication groove formed in said bearing surface and extending partially from said first end toward said second end and into a portion of the bearing surface contacting said center link, wherein lubrication supplied to said pin is retained in said lubrication groove.

17. The pin of claim 16 further comprising:
a second lubrication groove formed in said bearing surface and extending partially from said second end toward said first end and into another portion of the bearing surface contacting said center link, wherein lubrication supplied to said pin link is retained in said second lubrication groove.

18. The pin of claim 16 wherein said lubrication groove extends at a non-perpendicular angle from said first end.

19. The pin as in claim 16 wherein said pin further comprises an enlarged portion of said lubrication groove forming the mouth of the lubrication groove adjacent to said first end in which a lubricating fluid may be entrained and directed into said lubrication groove.

20. A pin for an X-link conveyor chain having a plurality of center links interconnected on opposite ends by paired side links and pins, each of said pins extending through said pair of said side links and one of said center links, each of said pins comprising:

a body having a first end and a second end, said body having a bearing surface defined by a substantially cylindrical exterior face;

a lubrication groove formed in said bearing surface and extending partially from said first end toward said second end, wherein lubrication supplied to said pin is retained in said lubrication groove; and said bearing surface exterior face has a parting line extending longitudinally across the bearing surface and said bearing surface is recessed in the area of the parting line to allow the parting line to be within the maximum diameter of the bearing surface.

21. A conveyor chain comprising:
a plurality of center links, said center links each having two parallel sides, a leading end and a trailing end, said leading end and said trailing end being generally U-shaped, said center links each having a semi-cylindrical pocket formed in at least one of said ends;

a plurality of side links, each of said side links having two parallel sides, a generally U-shaped leading end and a generally U-shaped trailing end, a pair of said side links being disposed on opposite sides of two of said center links to contact said two center links together;

a plurality of pins each having a substantially cylindrical body portion extending between a first end and a second end, said pins extending through one of said center links and two of said side links at one of said U-shaped ends of each of said one center link and two side links;

a bushing having a semi-cylindrical portion secured within said semi-cylindrical pocket, said bushing having end faces at two distal ends thereof said bushing having a bearing surface and a backing surface on opposite sides, said backing surface having a semi-cylindrical portion adapted to be fitted into said semi-circular pocket; and said center links having locking lips disposed adjacent the juncture of said semi-cylindrical pocket and said parallel sides, said parallel sides and said locking lips engaging said end faces of said bushing to interlock said bushing within said semi-cylindrical pocket.

* * * * *